J. C. CHAPMAN
BORING TOOL.
No. 63,992. Patented Apr. 23, 1867.
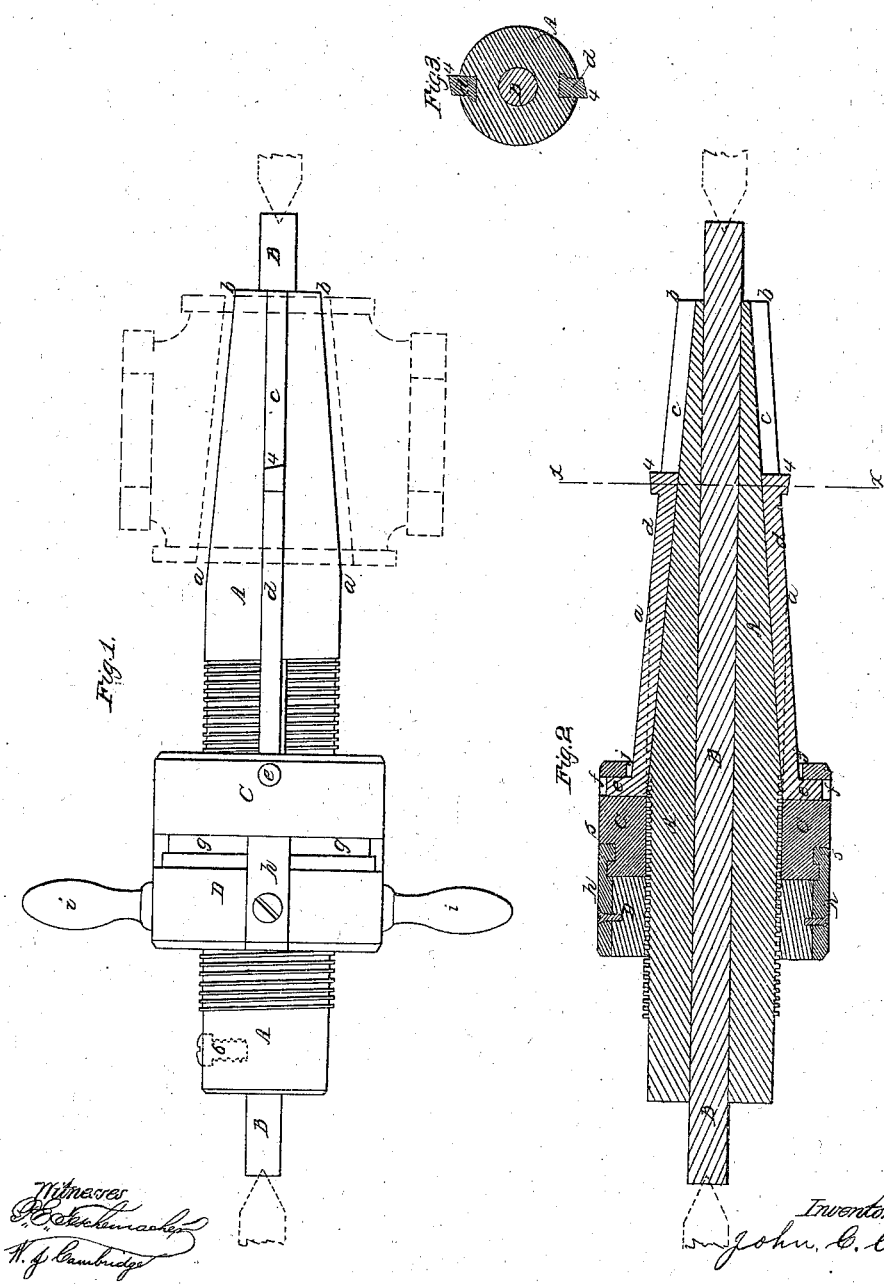

JOHN C. CHAPMAN, OF CAMBRIDGEPORT, MASSACHUSETTS.

*Letters Patent No. 63,992, dated April 23, 1867.*

IMPROVED BORING TOOL.

The Schedule referred to in these Letters Patent and making part of the same.

TO ALL WHOM IT MAY CONCERN:

Be it known that I, JOHN C. CHAPMAN, of Cambridgeport, in the county of Middlesex, and State of Massachusetts, have invented an Improved Tool for Boring Out Tapering Holes in Steam and Gas Cocks, and other articles, of which the following is a full, clear, and exact description, reference being had to the accompanying drawings, making part of this specification, in which—

Figure 1 is a side elevation of my improved tool, with the cock being operated upon represented in red.

Figure 2 is a central longitudinal section through the tool.

Figure 3 is a transverse section through the same on the line $x\,x$ of fig. 2.

Steam and gas cocks, etc., have heretofore been usually bored out in a lathe with an ordinary straight bar provided with one cutter, the cutter bar being inclined to correspond to the taper of the hole by moving the "tail stock" of the lathe to one side of the centre. This method, however, is objectionable for the reason that the cutter bar is liable to spring and render the work imperfect, making it necessary to repeat the boring operation two or three times, and as only one cutter is employed the work cannot be performed as rapidly as is desirable. Reaming tools have also been used, but their operation is slow, while they are expensive and liable to become quickly dull. To overcome these difficulties is the object of my invention, which consists in a tool which may be applied to an ordinary turning-lathe, said tool having a tapering plug provided with one or more sliding cutters which are fed forward on an inclined plane either by hand or by a suitable feed motion, by which means a tapering hole can be bored out with great rapidity and perfection.

To enable others skilled in the art to understand and use my invention, I will proceed to describe the manner in which I have carried it out.

In the said drawings, A is a round bar or plug, which is made conical from $a$ to $b$, with the amount of taper required for the hole to be bored out, and through the centre of this bar A passes an arbor, B, which projects out beyond it at each end and is set between the "centres" of the lathe in a straight line parallel with the ways, the cock or other article to be bored out being secured in the "chuck" and revolved in a well-known manner. On each side of the plug A is formed a groove, $c$, in which slides a cutter, $d$, provided with a cutting edge, 4. The bottoms of the grooves $c$ are inclined to the arbor B, and made to correspond with the taper of the exterior of the plug, so that as the cutters are moved forward longitudinally in their grooves they will tend toward the centre and form a true tapering hole, as required, and it will be seen that the two cutters working on opposite sides have a solid bearing in the bottoms of the grooves, which renders it impossible for them to spring and make imperfect work, and this solid bearing also allows the cutters to take off a thick chip, and thus performs the work more rapidly than has heretofore been practicable.

I will now describe the manner in which the cutters are fed up as the cutting proceeds. From the rear end of each cutter $d$ projects a pin, $e$, which fits into a hole, $f$, in a solid ring or collar, C, which slides freely on the straight portion of the bar A. This collar has a groove, $g$, extending entirely around it, into which fit the portions 5 of the pieces $h$, secured to a screw-nut, D, which works on the screw-thread cut on the straight portion of the bar A. The nut D is furnished with two handles, $i$, by which it is turned to carry the ring C forward or back, and with it the cutters $d$, as required. The pins $e$ slide up and down in the holes $f$ in the ring C according to the position of the cutter, slots $j$ being cut for the reception of the square portions of the cutters, as seen in fig. 2. If preferred, the screw-nut D and screw-thread on the straight portion of the bar A may be dispensed with, the ring C being connected with the feed motion of the lathe or other machine in which the tool is placed. The number of cutters $d$ may also be varied, one only, or more than two, being used, as may be found most desirable, and instead of revolving the cock or other article being bored, while the tool is held stationary, as above described, the operation may be reversed and the tool revolved instead.

The implement above described is simple in construction and not liable to get out of order, and a cock bored with this tool requires much less grinding in fitting the plug than when it is bored in the ordinary manner. The arbor B is held firmly in place by the screw 6, seen dotted in fig. 1, and when, after boring out the cock once, it is desired to bore it out a little larger to smooth it, the screw 6 is loosened and the plug A moved forward slightly on the arbor B and secured in place; and by thus moving the conical portion of the plug A further into the cock it will be seen that the cutters $d$ will be extended out further than before so as to enlarge the hole and smooth it out as required.

*Claim.*

What I claim as my invention, and desire to secure by Letters Patent, is—

The combination of the tapering plug A, arbor B, and sliding cutter or cutters $a$, with the nut D, all arranged and operating substantially as herein set forth.

JOHN C. CHAPMAN.

Witnesses:
 P. E. TESCHEMACHER,
 W. J. CAMBRIDGE.